US012583266B2

(12) United States Patent     (10) Patent No.:   US 12,583,266 B2

Kukson     (45) Date of Patent:     Mar. 24, 2026

(54) TIRE INFLATION SYSTEM

(71) Applicant: DEERE & COMPANY, Moline, IL (US)

(72) Inventor: Nathan B. Kukson, Jesup, IA (US)

(73) Assignee: DEERE & COMPANY, Moline, IL (US)

( * ) Notice: Subject to any disclaimer, the term of this patent is extended or adjusted under 35 U.S.C. 154(b) by 611 days.

(21) Appl. No.: 18/065,658

(22) Filed: Dec. 14, 2022

(65) Prior Publication Data

US 2023/0356548 A1     Nov. 9, 2023

Related U.S. Application Data

(60) Provisional application No. 63/364,419, filed on May 9, 2022.

(51) Int. Cl.
*B60C 23/00*     (2006.01)

(52) U.S. Cl.
CPC .. *B60C 23/00363* (2020.05); *B60C 23/00309* (2020.05)

(58) Field of Classification Search
CPC ... B60C 23/003; B60C 23/309; B60C 23/336; B60C 23/363
USPC ........................................................ 152/417
See application file for complete search history.

(56) References Cited

U.S. PATENT DOCUMENTS

| | | | |
|---|---|---|---|
| 4,434,833 | A | 3/1984 | Swanson et al. |
| 4,705,090 | A | 11/1987 | Bartos |
| 4,744,399 | A | 5/1988 | Magnuson et al. |
| 4,893,664 | A | 1/1990 | Oltean |
| 4,922,946 | A | 5/1990 | Boulicault |
| 5,147,494 | A | 9/1992 | Torii et al. |
| 5,174,839 | A | * 12/1992 | Schultz ............. B60C 23/00318 |
| | | | 384/489 |
| 5,313,995 | A | 5/1994 | Schultz |
| 5,398,743 | A | 3/1995 | Bartos |
| 5,516,379 | A | 5/1996 | Schultz |

(Continued)

FOREIGN PATENT DOCUMENTS

| | | |
|---|---|---|
| DE | 3535855 A1 | 4/1987 |
| DE | 102004021161 A1 | 11/2005 |

(Continued)

OTHER PUBLICATIONS

German Search Report issued in application No. 102023108779.7, dated Aug. 25, 2023, 4 pages.

*Primary Examiner* — S. Joseph Morano
*Assistant Examiner* — Eva L Comino

(57) ABSTRACT

A tire inflation system includes a first component rotating relative to a second component, a first passageway between the first and second components, the first passageway connecting a pressure source to a pressure consumer, a first seal in contact with an interface between the first and second components, the first seal maintaining pressurized fluid in the first passageway, a second seal in contact with the interface between the first and second components, the second seal spaced apart from the first seal forming a first chamber, a third seal in contact with the interface between the first and second components, the third seal spaced apart from the second seal forming a separate second chamber, and a second passageway connected to the separate second chamber and to the atmosphere.

20 Claims, 7 Drawing Sheets

(56)           References Cited

U.S. PATENT DOCUMENTS

| | | | |
|---|---|---|---|
| 5,979,526 | A | 11/1999 | Chamoy |
| 6,105,645 | A | 8/2000 | Ingram |
| 6,145,559 | A | 11/2000 | Ingram, II |
| 6,199,611 | B1 | 3/2001 | Wernick |
| 6,244,316 | B1 | 6/2001 | Naedler |
| 6,250,327 | B1 | 6/2001 | Freigang et al. |
| 6,325,124 | B1 | 12/2001 | Colussi et al. |
| 6,401,743 | B1 | 6/2002 | Naedler |
| 6,575,269 | B1 | 6/2003 | Skoff et al. |
| 7,089,953 | B2 | 8/2006 | Beau |
| 7,207,365 | B2 | 4/2007 | Nelson et al. |
| 7,772,506 | B2 | 8/2010 | Suter et al. |
| 7,963,159 | B2 | 6/2011 | Ingram et al. |
| 7,997,316 | B2 | 8/2011 | Walter et al. |
| 9,126,460 | B2 * | 9/2015 | Knapke ................. B60B 35/00 |
| 9,409,449 | B2 * | 8/2016 | Cis .................... B60C 23/00363 |
| 9,446,637 | B2 | 9/2016 | Knapke et al. |
| 10,059,156 | B2 | 8/2018 | Knapke et al. |
| 10,556,469 | B2 | 2/2020 | Foor et al. |
| 10,562,357 | B2 | 2/2020 | Burke et al. |
| 11,130,375 | B2 * | 9/2021 | Buhrke ............. B60C 23/00363 |
| 11,226,040 | B2 | 1/2022 | Bill et al. |
| 2002/0112802 | A1 | 8/2002 | D' Amico et al. |
| 2005/0121125 | A1 | 6/2005 | Maquaire |
| 2008/0185086 | A1 | 8/2008 | Ingram et al. |
| 2014/0062031 | A1 | 3/2014 | Honzek et al. |
| 2015/0075688 | A1 * | 3/2015 | Keeney ............ B60C 23/00336 |
| | | | 152/417 |
| 2017/0122435 | A1 * | 5/2017 | Molina ............ B60C 23/00318 |
| 2018/0037071 | A1 * | 2/2018 | Musgrave ........ B60C 23/00318 |

FOREIGN PATENT DOCUMENTS

| | | | | |
|---|---|---|---|---|
| DE | 102005006073 | A1 | 8/2006 | |
| DE | 102007036203 | A1 | 2/2009 | |
| DE | 102011004901 | A1 * | 9/2012 | ............ F16J 15/006 |
| DE | 102017223349 | A1 | 6/2019 | |
| EP | 0075723 | A1 | 4/1983 | |
| EP | 0410723 | B1 | 1/1994 | |
| EP | 0362921 | B1 | 11/1994 | |
| EP | 2655941 | B1 * | 8/2015 | ....... B60C 23/00336 |
| EP | 2655101 | B1 * | 9/2015 | ....... B60C 23/00372 |
| JP | S63199932 | A | 8/1988 | |
| WO | WO2007109818 | A1 | 10/2007 | |

* cited by examiner

TIRE INFLATION SYSTEM

CROSS-REFERENCE TO RELATED APPLICATIONS

This application claims the benefit of U.S. Provisional Application No. 63/364,419, filed May 9, 2022, which is hereby incorporated by reference.

FIELD OF THE DISCLOSURE

The present disclosure relates to a tire inflation system for a work vehicle.

BACKGROUND

Work vehicles can include central tire inflation systems to increase or decrease pressure in the tires. Central tire inflation systems can utilize a rotary seal between rotating and non-rotating components to provide pressurized air from the work vehicle to the tires. The rotary seal provides a passage for the pressurized air to flow between the rotating and non-rotating components.

SUMMARY

According to an aspect of the present disclosure, a tire inflation system includes a first component rotating relative to a second component, a first passageway between the first and second components, the first passageway connecting a pressure source to a pressure consumer, a first seal in contact with an interface between the first and second components, the first seal maintaining pressurized fluid in the first passageway, a second seal in contact with the interface between the first and second components, the second seal spaced apart from the first seal forming a first chamber, a third seal in contact with the interface between the first and second components, the third seal spaced apart from the second seal forming a separate second chamber, and a second passageway connected to the separate second chamber and to the atmosphere.

According to an aspect of the present disclosure, the first, second, and third seals are connected to a first seal sleeve, which maintains the relative spacing of the connected seals.

According to an aspect of the present disclosure, the tire inflation system includes a fourth seal in contact with an interface between the first and second components, the fourth seal positioned on a opposite side of the first passageway than the first seal, the fourth seal maintaining pressurized fluid in the first passageway, a fifth seal in contact with the interface between the first and second components, the fifth seal spaced apart from the fourth seal forming a third chamber, a sixth seal in contact with the interface between the first and second components, the sixth seal spaced apart from the fifth seal forming a separate fourth chamber, and a third passageway connected to the separate fourth chamber and to the atmosphere.

According to an aspect of the present disclosure, the first, second, and third seals are connected to a first seal sleeve, which maintains the relative spacing of the first, second, and third seals, and wherein the fourth, fifth, and sixth seals are connected to a second seal sleeve, which maintains the relative spacing of the fourth, fifth, and sixth seals.

According to an aspect of the present disclosure, the first and second seal sleeves are connected to an outer sleeve, which maintains the relative spacing between the first and second seal sleeves, and the outer sleeve is connected to the first component.

According to an aspect of the present disclosure, the first, second, third, fourth, fifth, and sixth seals are connected to a first seal sleeve, which maintains the relative spacing of the connected seals.

According to an aspect of the present disclosure, the second and third passageways are connected to each other.

According to an aspect of the present disclosure, the tire inflation system includes a valve connected to the second passageway, the valve configured to permit fluid to enter the second passageway via the valve and to prevent fluid from exiting the second passageway via the valve.

According to an aspect of the present disclosure, the pressure source is a source of compressed gas.

According to an aspect of the present disclosure, the pressure consumer is a tire.

According to an aspect of the present disclosure, a tire inflation system includes a first component rotating relative to a second component, a first passageway between the first and second components, the first passageway connecting a pressure source to a pressure consumer, a first seal sleeve positioned between the first and second components, the first seal sleeve including a first seal positioned near the first passageway, a second seal spaced apart from the first seal forming a first chamber, and a third seal spaced apart from the second seal forming a separate second chamber, and a second passageway connecting the separate second chamber to the atmosphere.

According to an aspect of the present disclosure, the first seal sleeve includes a fourth seal positioned near the first passageway on an opposite side of the first passageway, a fifth seal spaced apart from the fourth seal forming a third chamber, and a sixth seal spaced apart from the fifth seal forming a separate fourth chamber, and wherein a third passageway connects the separate fourth chamber to the atmosphere.

According to an aspect of the present disclosure, the tire inflation system includes a second seal sleeve positioned between the first and second components on an opposite side of the first passageway from the first seal sleeve, the second seal sleeve including a fourth seal positioned near the first passageway on an opposite side of the first passageway from the first seal, a fifth seal spaced apart from the fourth seal forming a third chamber, and a sixth seal spaced apart from the fifth seal forming a separate fourth chamber, and a third passageway connecting the separate fourth chamber to the atmosphere.

According to an aspect of the present disclosure, the first seal sleeve is connected to an outer sleeve connected to the first component.

The above and other features will become apparent from the following detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the present disclosure to these implementations.

Figure 1:
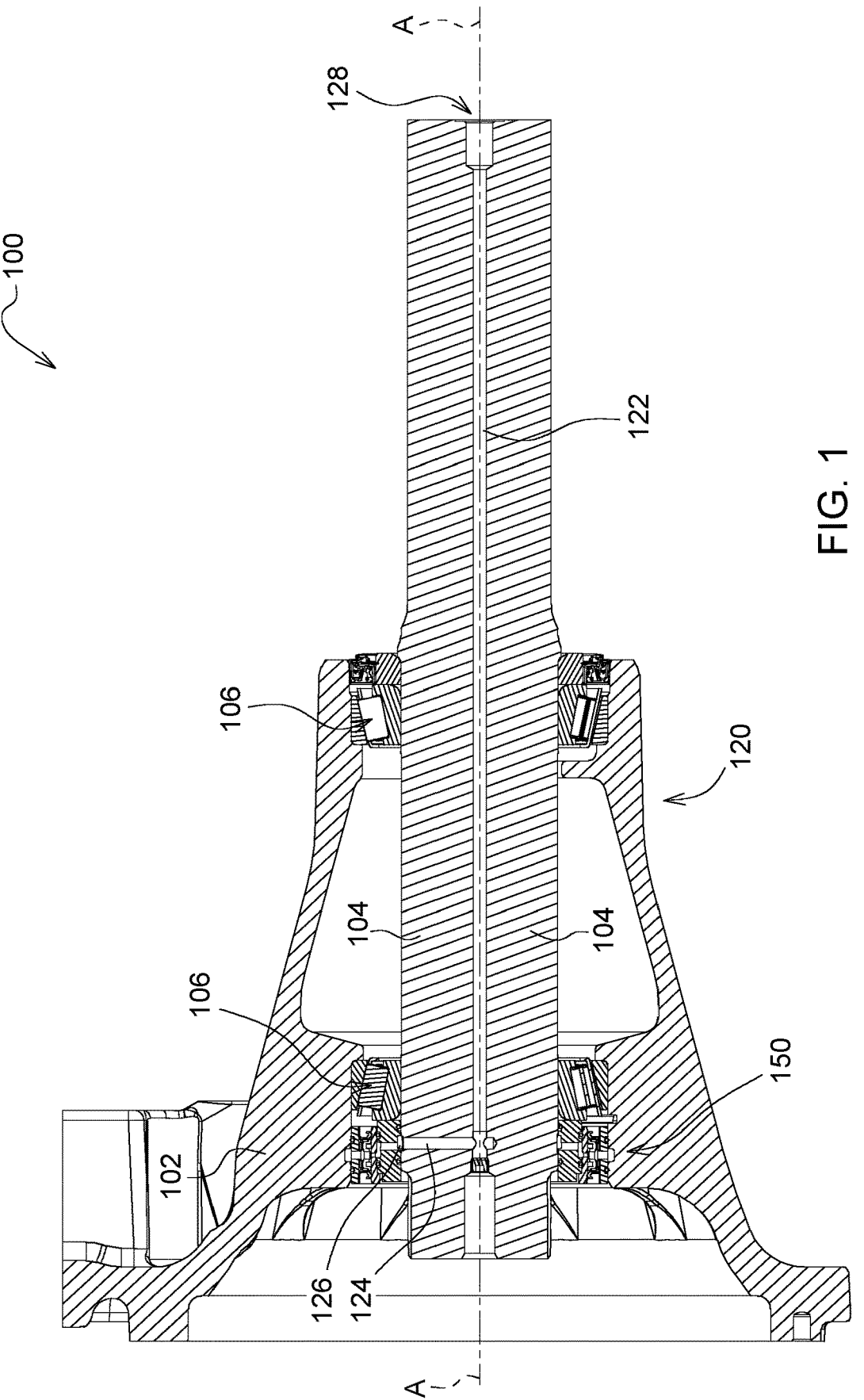
FIG. 1 is a cross-sectional view in an axial direction of an axle for a work vehicle, according to an implementation.
Figure 2:
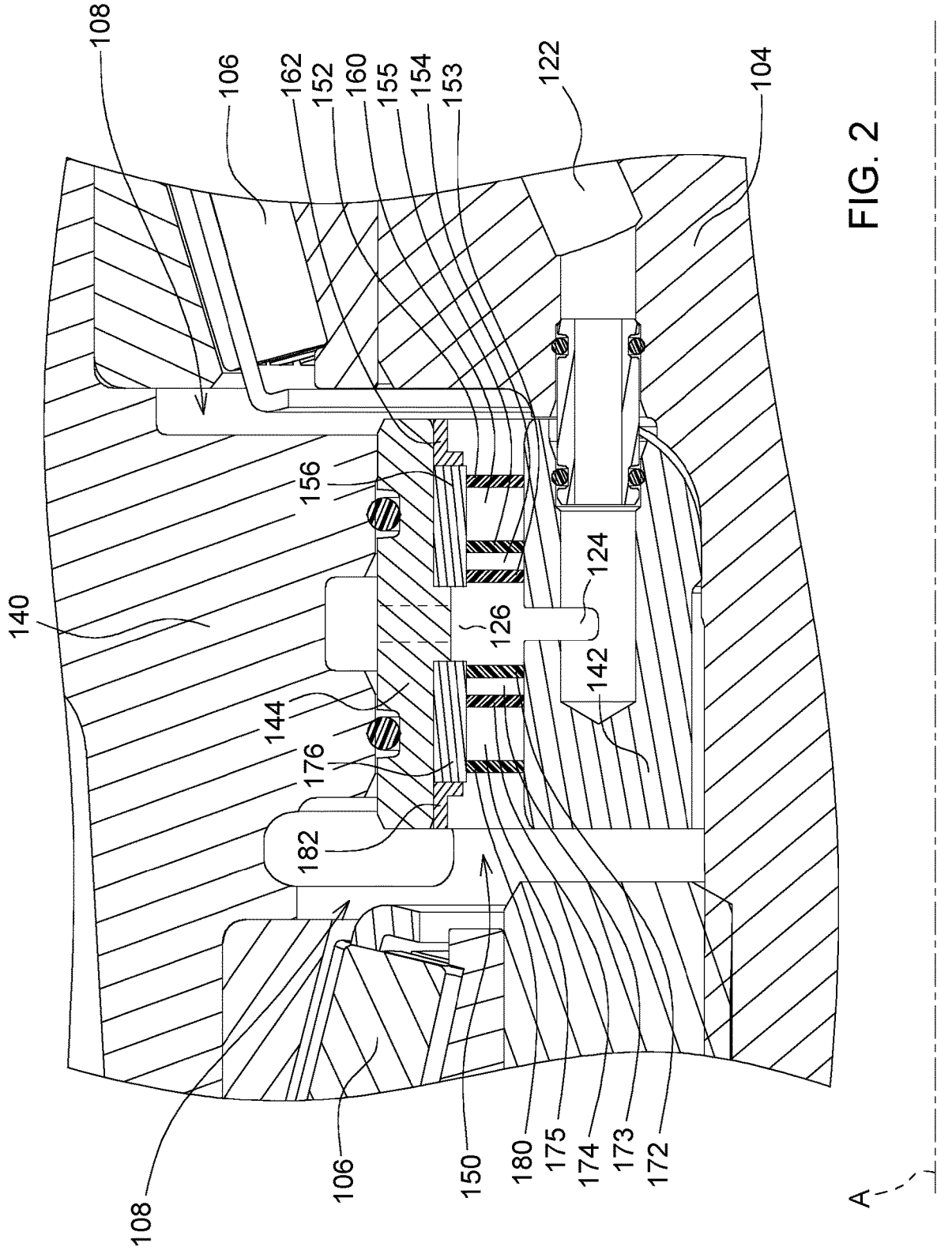
FIG. 2 is a cross-sectional view of a rotary seal apparatus, according to an implementation.
Figure 3:
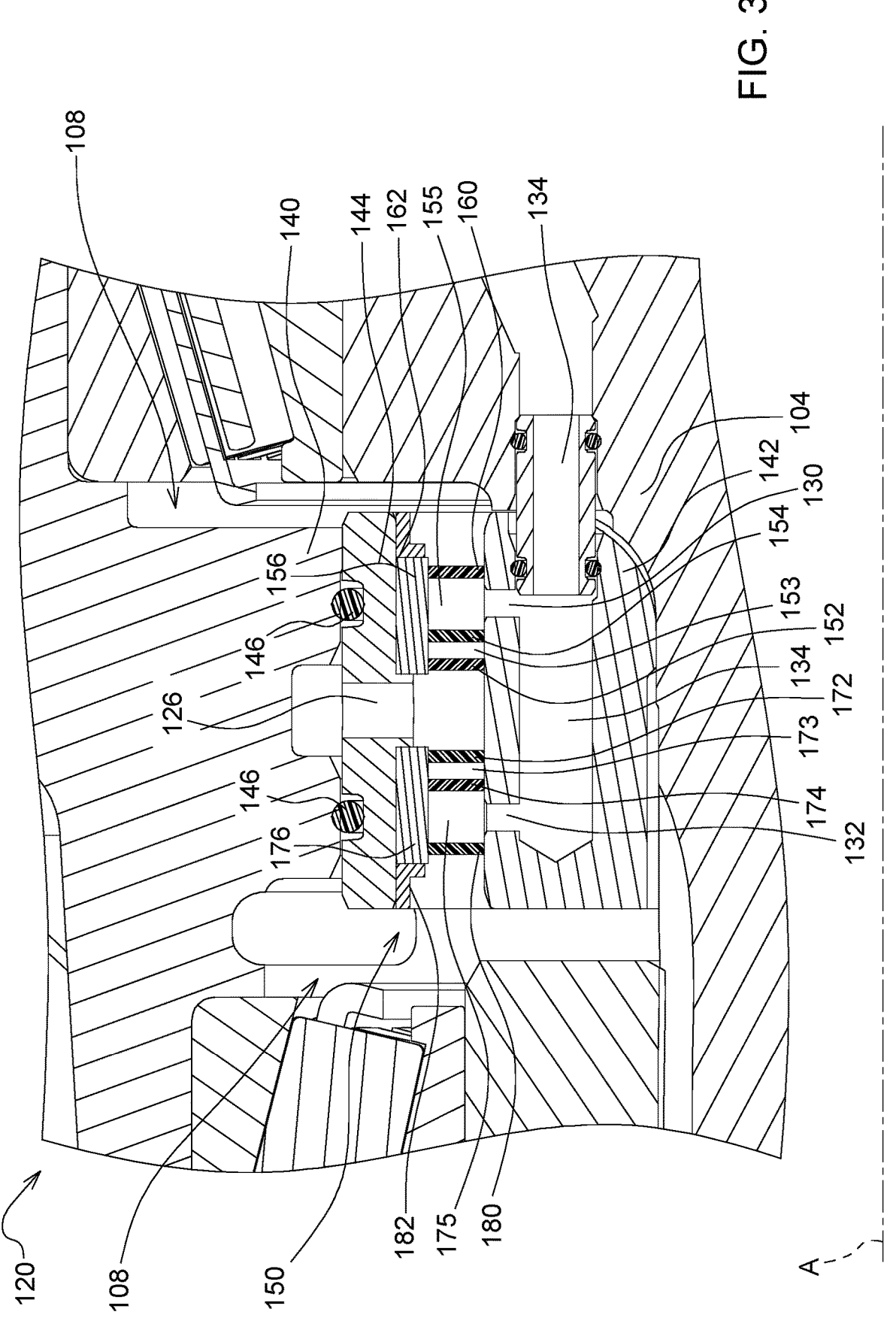
FIG. 3 is a cross-sectional view of a rotary seal apparatus, according to an implementation.
Figure 4:
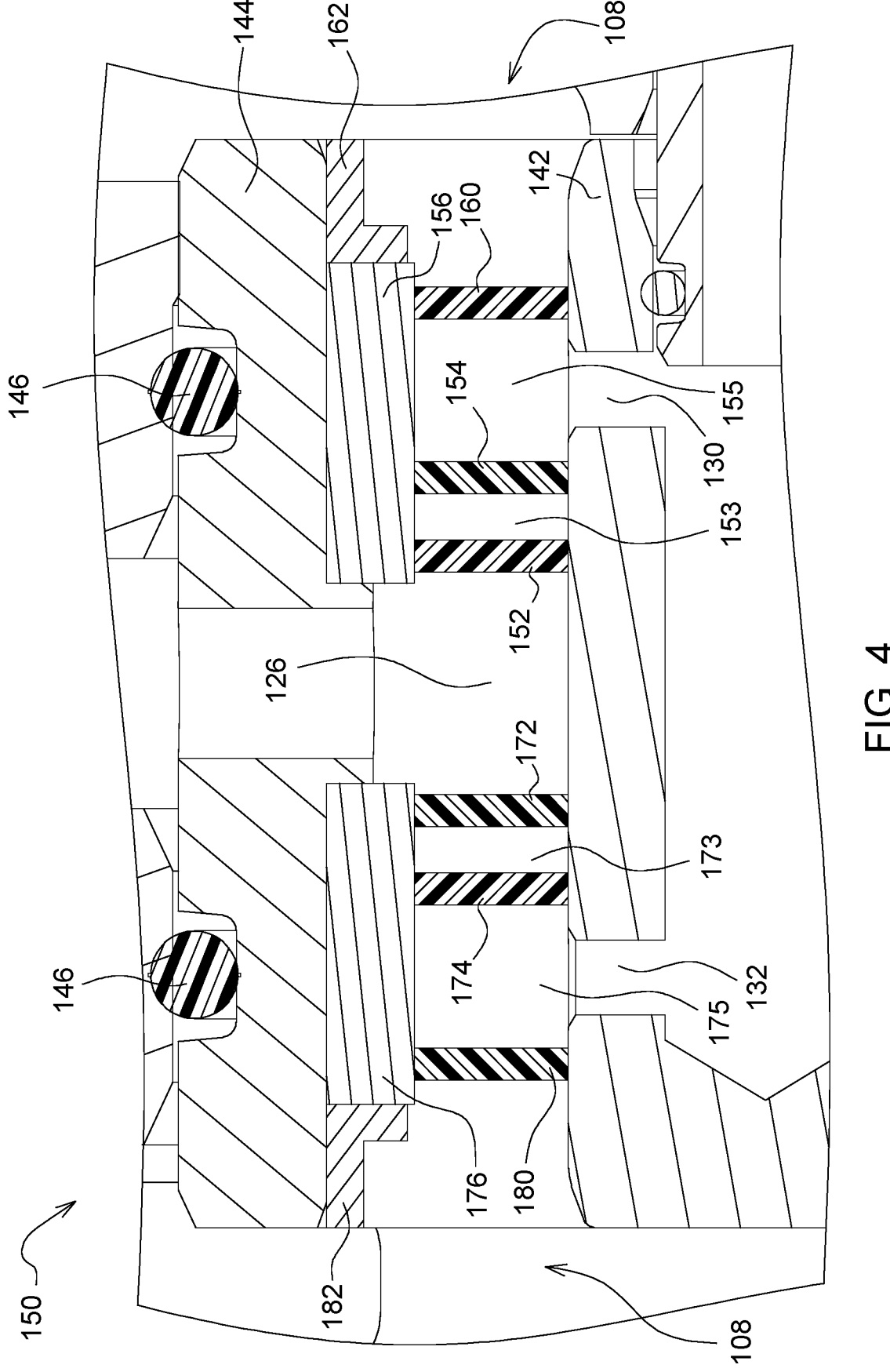
FIG. 4 is a cross-sectional view of a rotary seal apparatus, according to an implementation.

With reference to FIG. 1, a tire inflation system 120, or a central tire inflation system, for a work vehicle 100 includes a rotary seal apparatus 150. The work vehicle 100 includes a housing 102, an axle 104, and one or more bearings 106 positioned between the housing 102 and the axle 104. The axle 104 includes an axial passageway 122 and a radial passageway 124. An end 128 of the axial passageway 122 can connect to a pressure source, such as a gas or air compressor, or a pressure consumer, such as a tire. A passageway 126 can connect to the radial passageway 124 to the rotary seal apparatus 150, which can connect to a pressure source or a consumer. According to some implementations, the axle 104 rotates about the axis of rotation A.

With reference to FIGS. 2-7, an axle 104 can include an inner sleeve 142. The axle 104 or the inner sleeve 142 can include a first vent 130, a second vent 132, and a passageway 134 connected directly or indirectly to atmosphere or ambient pressure via an opening, a breather, a check valve, or other apparatus. A wheel hub 140 encircles the axle 104 and is supported by bearings 106 located on each side of the rotary seal apparatus 150. The bearings 106 can be positioned in a lubricant chamber 108. One or more tires can connect to the wheel hub 140. An outer sleeve 144 is positioned adjacent the wheel hub 140. A passageway 126 can connect to radial passageway 124 and axial passageway 122 shown in FIG. 1, which leads to a pressure source. The passageway 126 leads up to the one or more tires. According to some implementations, the wheel hub 140 rotates around the axle 104 about the axis of rotation A.

A tire inflation system 120, or a central tire inflation system, includes rotary seal apparatus 150 positioned between two components rotating relative to each other. One component could be rotating while the other component could be stationary, the two components could be rotating in the same direction at different speeds, or the two components could be rotating in opposite directions. According to some implementations, a tire inflation system 120 includes rotary seal apparatus 150 positioned between a rotating component and a non-rotating component. The rotary seal apparatus 150 maintains a passageway 126 for pressurized fluid, such as a gas or air, between the rotating and non-rotating components. The rotary seal apparatus 150 can be connected or attached to either the rotating or non-rotating component. The rotary seal apparatus 150 has one or more seals 152, 154, 172, 174, 160, 180, which can interact or interface with the rotating or non-rotating component. The one or more seals 152, 154, 172, 174, 160, 180 can be positioned radially inwards towards the axis of rotation A or radially outward away from the axis of rotation A. The one or more seals 152, 154, 172, 174, 160, 180 can be any type of seals with any shape or configuration. The one or more seals 152, 154, 172, 174, 160, 180 can all be contact with the inner sleeve 142 or the axle 104.

The rotary seal apparatus 150 can include a first seal 152 positioned on one side of the passageway 126. The rotary seal apparatus 150 can include a second seal 154 spaced apart axially from the first seal 152, forming a first chamber 153. The first and second seals 152, 154 can be gas or air seals. The rotary seal apparatus 150 can include a third seal 160 positioned axially from the second seal 154, forming a separate second chamber 155. The third seal can be a lubricant or oil seal. A bearing 106 can be positioned axially from the third seal 160. The bearing 106 can be positioned in a lubricant chamber 108 adjacent the third seal 160. The first seal 152, second seal 154, and third seal 160 can connect or attach to a seal sleeve 156, which can maintain the relative spacing or arrangement of the seals. The first seal 152, second seal 154, seal sleeve 156, and third seal 160 can be connected or attached separately or as a single unit or piece to the outer sleeve 144. A fastener or retainer 162 can maintain the axial position of the one or more seals 152, 154, 160 relative to the outer sleeve 144. The retainer 162 can be an axial retention ring.

The rotary seal apparatus 150 can include a fourth seal 172 positioned on the other or opposite side of the passageway 126 from the first seal 152. The rotary seal apparatus 150 can include a fifth seal 174 spaced apart axially from the fourth seal 172, forming a third chamber 173. The fourth and fifth seals 172, 174 can be gas or air seals. The rotary seal apparatus 150 can include a sixth seal 180 positioned axially from the fifth seal 174, forming a separate fourth chamber 175. The sixth seal 180 can be a lubricant or oil seal. A bearing 106 can be positioned axially from the sixth seal 180. The bearing 106 can be positioned in a lubricant chamber 108 adjacent the third seal 160. The fourth seal 172, fifth seal 174, and sixth seal 180 can connect or attach to a seal sleeve 176, which can maintain the relative spacing or arrangement of the seals. The fourth seal 172, fifth seal 174, seal sleeve 176, and sixth seal 180 can be connected or attached separately or as a single unit or piece to the outer sleeve 144. A fastener or retainer 182 can maintain the axial position of the one or more seals 172, 174, 180 relative to the outer sleeve 144. The outer sleeve 144 can extend axially beyond or past the lubricant seals 160, 180 positioned at each end. The outer sleeve 144 can maintain the relative spacing or arrangement of the seal sleeves 156, 176.

Figure 5:
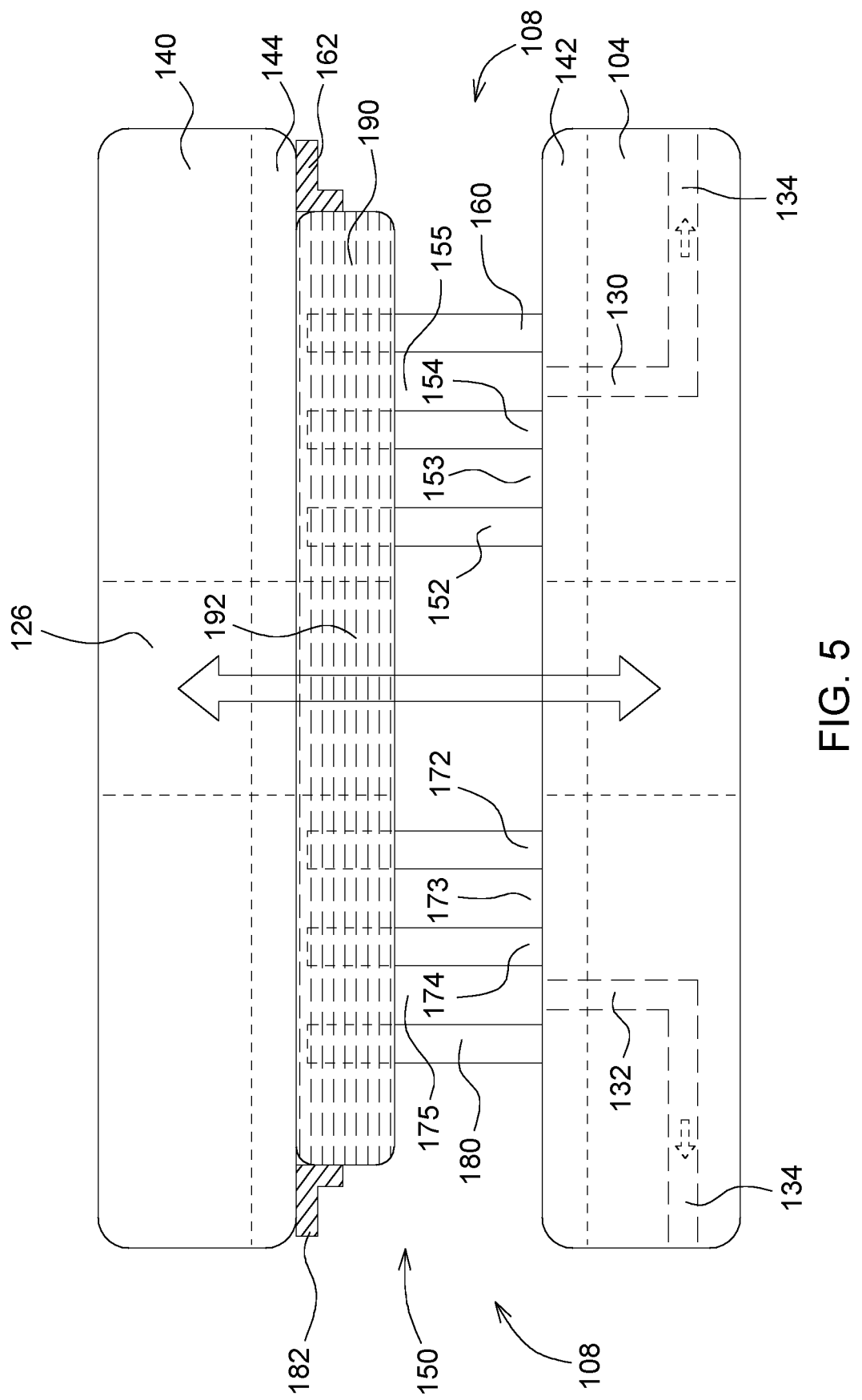
FIG. 5 is a cross-sectional view of a rotary seal apparatus, according to an implementation.

With reference to FIG. 5, the one or more seals 152, 154, 160, 172, 174, 180 can connect or attach to a single or unitary seal sleeve 190, which can maintain the relative spacing or arrangement of the seals. The seal sleeve 190 can include a passageway 192, which coincides or corresponds with passageway 126. The seal sleeve 190 can extend beyond the lubricant seals 160, 180 positioned at each side or end.

Figure 6:
FIG. 6 is a cross-sectional view of a rotary seal apparatus, according to an implementation.
Figure 7:
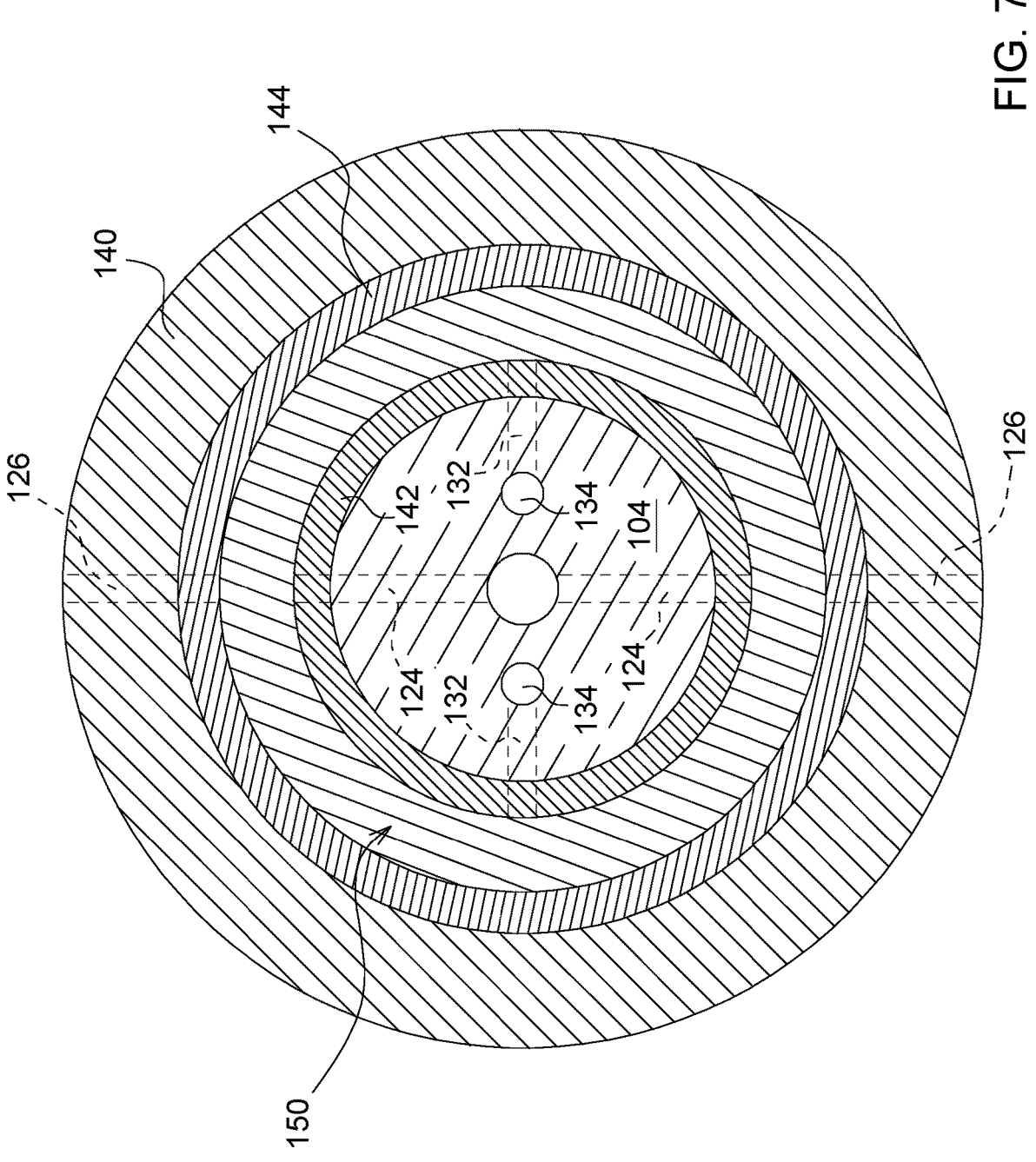
FIG. 7 is a cross-sectional view in a radial direction of an axle for a work vehicle, according to an implementation.

With reference to FIG. 6, a valve 200 can connect to the passageway 134. The valve 200 can be a check valve or one-way valve positioned or located between the passageway 134 and a bearing 106. The valve 200 prevents pressurized gas or air from exiting or leaving the passageway 134 and entering the lubricant chamber 108. The valve 200 allows pressurized gas or air to enter the passageway 134 from the lubricant chamber 108. If the gas or air in the lubricant chamber 108 becomes pressurized, the valve 200 allows this pressurized gas or air to exit the lubricant chamber 108 via the passageway 134, bypassing the rotary seal apparatus 150. The valve 200 The valve 200 can include a filter or separator to prevent liquids, such as oil or hydraulic or transmission fluid, from entering the passageway 134.

During operation, pressurized fluid, such as a gas or air, flows through passageway 126 between the rotating and non-rotating components from a pressure source or a pressure consumer. The first and third seals 152, 172 maintain the pressurized fluid in the passageway 126. If any pressurized fluid passes the first seal 152, the pressurized fluid enters the first chamber 153. The second seal 154 maintains the pressurized fluid in the first chamber 153. The second seal 154 can maintain the pressurized fluid in the first chamber 153 until the passageway 126 no longer includes pressurized fluid. The pressurized fluid in the first chamber 153 could return to the passageway 126 when the passageway 126 is no longer under pressure. If any pressurized fluid passes the second seal 154, the pressurized fluid enters the separate second chamber 155. The third seal 160 prevents the pressurized fluid from passing into a lubricant chamber 108, which can include one or more bearings, gears, or other drivetrain components. The pressurized fluid exits the second chamber 155 via the vent 130 and passageway 134 to the atmosphere, either directly or indirectly. A similar process occurs if any pressurized fluid passes the fourth seal 172 into the third chamber 173. This double seal design provides multiple fluid seals and multiple fluid chambers for the pressurized fluid.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A tire inflation system, comprising:
a first component rotating relative to a second component;
a first passageway between the first and second components, the first passageway connecting a pressure source to a pressure consumer;

6 a first seal in contact with an interface between the first and second components, the first seal maintaining pressurized fluid in the first passageway;
a second seal in contact with the interface between the first and second components, the second seal spaced apart from the first seal forming a first chamber, and the first seal positioned between the second seal and the first passageway;
a third seal in contact with the interface between the first and second components, the third seal spaced apart from the second seal forming a separate second chamber, the third seal positioned between the second seal and a lubricant chamber including a bearing, and the first, second, and third seals positioned on a first side of the first passageway;
a second passageway connected to the separate second chamber and to the atmosphere, the second passageway separated from the first passageway by the first and second seals; and
a valve connected to the second passageway and positioned between the lubricant chamber and the second passageway, the valve configured to permit fluid to enter the second passageway via the valve from the lubricant chamber and to prevent fluid from exiting the second passageway via the valve into the lubricant chamber.

2. The tire inflation system of claim 1, wherein the first, second, and third seals are connected to a first seal sleeve, which maintains the relative spacing of the connected seals.

3. The tire inflation system of claim 1, further comprising:
a fourth seal in contact with the interface between the first and second components, the fourth seal positioned on a opposite side of the first passageway than the first seal, the fourth seal maintaining pressurized fluid in the first passageway;
a fifth seal in contact with the interface between the first and second components, the fifth seal spaced apart from the fourth seal forming a third chamber;
a sixth seal in contact with the interface between the first and second components, the sixth seal spaced apart from the fifth seal forming a separate fourth chamber; and
a third passageway connected to the separate fourth chamber and to the atmosphere.

4. The tire inflation system of claim 3, wherein the first, second, and third seals are connected to a first seal sleeve, which maintains the relative spacing of the first, second, and third seals, and wherein the fourth, fifth, and sixth seals are connected to a second seal sleeve, which maintains the relative spacing of the fourth, fifth, and sixth seals.

5. The tire inflation system of claim 4, wherein the first and second seal sleeves are connected to an outer sleeve, which maintains the relative spacing between the first and second seal sleeves, and the outer sleeve connected to the first component.

6. The tire inflation system of claim 3, wherein the first, second, third, fourth, fifth, and sixth seals are connected to a first seal sleeve, which maintains the relative spacing of the connected seals.

7. The tire inflation system of claim 3, wherein the second and third passageways are connected to each other.

8. The tire inflation system of claim 1, wherein the pressure source is a source of compressed gas.

9. The tire inflation system of claim 1, wherein the pressure consumer is a tire.

10. A tire inflation system, comprising:
a first component rotating relative to a second component;

a first passageway between the first and second components, the first passageway connecting a pressure source to a pressure consumer;

a first seal sleeve positioned between the first and second components, the first seal sleeve including a first seal positioned near the first passageway, a second seal spaced apart from the first seal forming a first chamber, and a third seal spaced apart from the second seal forming a separate second chamber, the first, second, and third seals positioned on a first side of the first passageway, the first seal positioned between the second seal and the first passageway, and the third seal positioned between the second seal and a lubricant chamber including a bearing;

a second passageway connecting the separate second chamber to the atmosphere, the second passageway separated from the first passageway by the first and second seals; and a valve connected to the second passageway and positioned between the lubricant chamber and the second passageway, the valve configured to permit fluid to enter the second passageway via the valve from the lubricant chamber and to prevent fluid from exiting the second passageway via the valve into the lubricant chamber.

11. The tire inflation system of claim 8, wherein the first seal sleeve includes a fourth seal positioned near the first passageway on an opposite side of the first passageway, a fifth seal spaced apart from the fourth seal forming a third chamber, and a sixth seal spaced apart from the fifth seal forming a separate fourth chamber, and wherein a third passageway connects the separate fourth chamber to the atmosphere.

12. The tire inflation system of claim 8, further comprising:

a second seal sleeve positioned between the first and second components on an opposite side of the first passageway from the first seal sleeve, the second seal sleeve including a fourth seal positioned near the first passageway on an opposite side of the first passageway from the first seal, a fifth seal spaced apart from the fourth seal forming a third chamber, and a sixth seal spaced apart from the fifth seal forming a separate fourth chamber; and a third passageway connecting the separate fourth chamber to the atmosphere.

13. The tire inflation system of claim 11, wherein the first seal sleeve is connected to an outer sleeve connected to the first component.

14. The tire inflation system of claim 12, wherein the first and second seal sleeves are connected to an outer sleeve, which maintains the relative spacing between the first and second seal sleeves, and the outer sleeve connected to the first component.

15. The tire inflation system of claim 11, wherein the second and third passageways are connected to each other.

16. The tire inflation system of claim 12, wherein the second and third passageways are connected to each other.

17. The tire inflation system of claim 10, wherein the pressure source is a source of compressed gas.

18. The tire inflation system of claim 10, wherein the pressure consumer is a tire.

19. The tire inflation system of claim 1, wherein the valve is a check valve.

20. The tire inflation system of claim 10, wherein the valve is a check valve.

\* \* \* \* \*